United States Patent [19]
Archer

[11] 3,766,715
[45] Oct. 23, 1973

[54] METHOD AND APPARATUS FOR COMBUSTIBLE GAS DETECTION IN DIRT LADEN ATMOSPHERE

[75] Inventor: Lee A. Archer, Wheaton, Ill.

[73] Assignee: Erdco Engineering Corporation, Addison, Ill.

[22] Filed: May 26, 1971

[21] Appl. No.: 146,884

[52] U.S. Cl............................ 55/96, 55/21, 55/97, 55/270, 55/272, 55/274, 55/283, 55/302, 55/350, 55/383, 55/385, 55/467, 55/503, 55/505, 55/511, 73/23 R, 73/421.5 R
[51] Int. Cl............................................. B01d 46/10
[58] Field of Search ................. 55/96, 16, 19, 158, 55/270, 274, 21, 97, 272, 283, 302, 350, 383, 385, 467, 503, 505, 511; 204/195 P; 73/23 R, 421.5 R, 421.5 A, 422 R, 422 TC

[56] References Cited
UNITED STATES PATENTS

| | | | |
|---|---|---|---|
| 2,556,832 | 6/1951 | Vollrath | 55/126 X |
| 2,901,626 | 8/1959 | Becker | 250/45 X |
| 3,198,721 | 8/1965 | Rich | 204/157 |
| 3,258,896 | 7/1966 | Muller | 55/19 X |
| 3,369,346 | 2/1968 | Wildbolz et al. | 55/97 |
| 3,457,787 | 7/1969 | Maatsch et al. | 73/421.5 |
| 3,468,781 | 9/1969 | Lucero | 204/195 P |
| 3,674,435 | 7/1972 | VanLuik, Jr. et al. | 23/232 R |

Primary Examiner—Dennis E. Talbert, Jr.
Attorney—Darbo, Robertson and Vandenburgh

[57] ABSTRACT

A diffusion type head for detection of combustible gas is placed within an enclosure. At least part of the wall forming the enclosure is of an air filtering material. A conduit communicating with the interior of the enclosure has a vacuum applied thereto so that a draft of air exterior of the enclosure is drawn through the filter and about the diffusion type detector. Periodically the vacuum is shut off and a blast of gas under pressure is applied to the conduit to create a reverse flow through the filter and clean out the filter.

3 Claims, 2 Drawing Figures

PATENTED OCT 23 1973          3,766,715

Inventor
Lee A. Archer
By Darbo, Robertson & Vandenburgh
Attorneys

METHOD AND APPARATUS FOR COMBUSTIBLE GAS DETECTION IN DIRT LADEN ATMOSPHERE

BACKGROUND AND SUMMARY OF THE INVENTION

Diffusion type detection heads for combustible gases are particularly desirable because they can be located relatively close to points at which the combustible gas might be expected to develop, being herein defined as the "primary zone" in which trouble may occur. Being close they will respond rather rapidly and thus produce a warning of a dangerous condition shortly upon its occurrence. However, if they are used in a dusty or dirty atmosphere, the diffusion cap will tend to plug up. To the extent that it does so, the combustible gas cannot get through to the hot wire or other sensing element inside with the result that an alarm does not sound when it should. The same result may occur when considerable moisture is present. For example, in a high humidity atmosphere there is likely to be condensation on the diffusion cap with the result that the openings therein become blocked.

In the present invention the diffusion head is located in an enclosure having at least a part of a wall of a filter material. A vacuum is drawn inside the enclosure so that the ambient air or gas exterior of the enclosure is drawn through the filter and about the diffusion head. The filter removes dust, dirt and the like so that there is little if any tendency to clog the interstices in the diffusion head. Periodically a reverse blast of gas (usually air) is applied to the interior of the enclosure to blow through the filter and serve to clean the filter.

Such apparatus has another advnatage in that it insures that there is a continual air movement from the room being monitored to a position about the diffusion head. It is not uncommon to have diffusion heads positioned in a room at a location at which, for some reason, the ambient air does not move to and about the diffusion head from the point at which a combustible gas leak is likely to occur. There actually may be a reverse ambient air movement, that is, in a direction away from the diffusion head toward the point of greatest danger. The draft employed in connection with the present invention acts to insure that the diffusion head is not located in a dead spot so far as air movement is concerned. If there is a combustible gas in the vicinity it will be drawn to and about the head where it can diffuse inside to the sensing element and insure that a signal will result.

There are prior art combustible gas detectors wherein the ambient air is drawn into intakes and along conduits to a central sensing station wherein the air from a variety of locations is sequentially tested. These have the disadvantage that there may be a relatively long time delay between the occurrence of a combustible gas in an area of the building and the time that samples of that combustible gas get to the central testing station, being a "secondary3[ detection zone as distinguished from the "primary zone" as hereinbefore defined. In the present invention the testing is done at the outer ends of the conduit, i.e., at the very locations at which a combustible gas is likely to occur so that almost an immediate response is obtained upon the occurrence of a combustible gas.

Further objects and advantages will be apparent from the following description taken in conjunction with the drawings.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Figure 1:
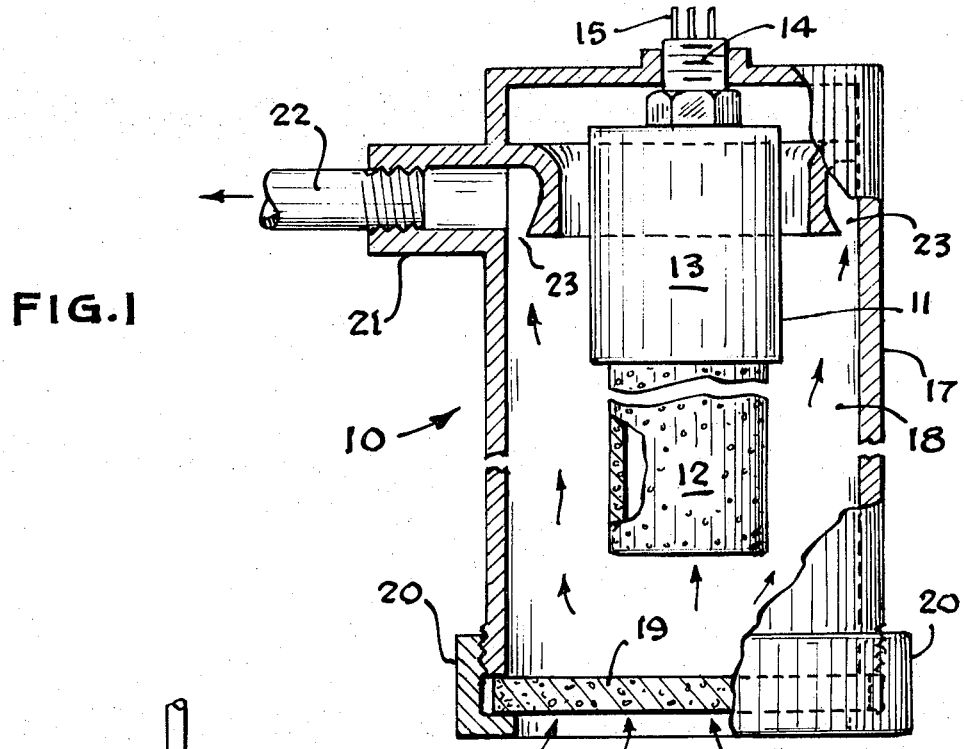
FIG. 1 is a sectional view of an enclosure within which is a diffusion type testing head.

FIG. 1 illustrates a detection station (or head), generally 10. This includes a diffusion type tester 11. This can, for example, be of the type disclosed in U. S. Pat. No. 3,522,010, issued July 28, 1970. It has a porous diffusion cap 12 within which is a sensing element not shown. The cap is mounted on a base 13 having a threaded mounting stem 14. Coming out through the interior of the stem is the wiring 15 for the detector.

The detection station 10 also includes an enclosure 17 about the detector 11 and defining a space 18 therebetween. One wall of the enclosure 17 is formed by a replaceable filter element 19. It is held in place by a cap 20 threaded to the main body of the enclosure 17. At a position in the wall of enclosure 17, which is remote from the filter 19, is a boss 21 threaded to receive a conduit 22. The walls of enclosure 17 define an annular orifice 23 communicating with the interior and with conduit 22. The orifice location is such that when a vacuum is applied to conduit 22 the ambient gas outside the detection station will be drawn in through filter 19 and about the porous cap 12 before it exits through the opening in boss 21. Also, when fluid pressure is applied to conduit 22 (as hereinafter described) the air flow will be in the general direction of the filter 19.

Figure 2:
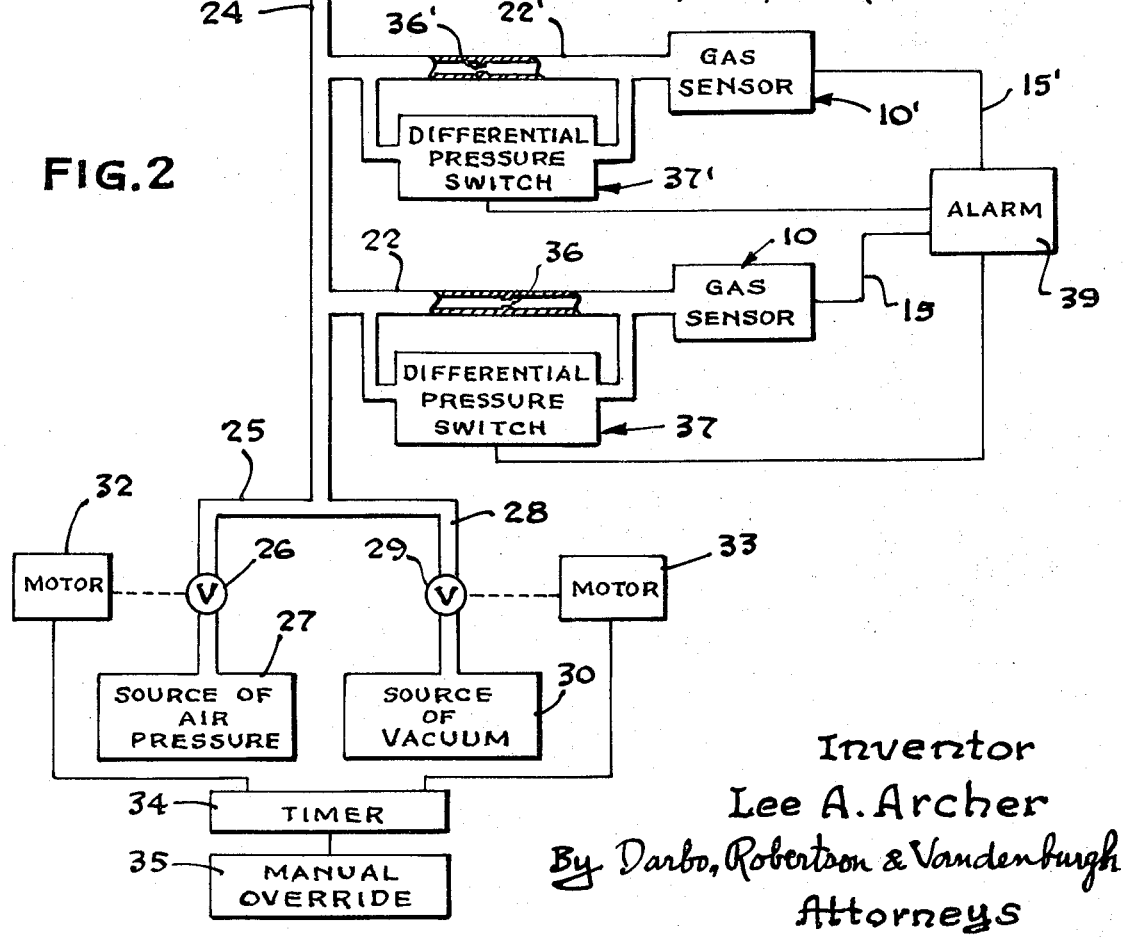
FIG. 2 is a schematic view of the overall system embodying a plurality of heads such as that illustrated in FIG. 1.

Referring to FIG. 2, it will be seen that the conduits 22 and 22' from the detection stations 10 and 10', respectively, communicate with a manifold 24. This manifold also leads to other detection stations not shown. From the manifold a branch pipe 25 leads through a valve 26 to a suitable source 27 of gas, e.g., air, under pressure. A similar branch pipe 28 leads from the manifold 24 through a valve 29 and to a source of vacuum 30, such as a vacuum pump. Valve 26 is operated by a motor 32, while valve 29 is operated by a motor 33. The motors 32 and 33 are controlled in sequence by a timer 34. This timer can include a manual override 35 so that the valves 26 and 29 can be actuated other than in the sequence that would normally be dictated by timer 34.

In conduit 22 is an orifice 36. At each side of this orifice the conduit communicates with a pressure differential switch 37. There is a similar arrangement of an orifice 36' and a pressure differential switch 37' in connection with conduit 22'. So long as the flow across the orifices is within normal tolerances, the respective switch will be open. But, should the flow become too little (indicative of a clogged filter) the pressure differential across the orifice would be low and the switch will be closed as a result.

In any given period of time, e.g., a working day, the valve 29 would be open most of the time, with valve 26 being closed when valve 29 is open. This condition applies a vacuum to manifold 24 and to the space 18 within the detection stations through conduits 22. This vacuum would cause the flow of the ambient gas, normally air, into the space 18 and about the diffusion cap 12. However, at predetermined intervals, say once an hour, the timer 34 would tell motor 33 to close valve 29 briefly and while it was closed would tell motor 32 to briefly open valve 26. Thus, the gas under pressure from source 27 would flow through manifold 24, conduits 22, and from space 18 out through filter 19. This pressurized gas should produce a pressure against filter 19 of at least the equivalent of two inches of water to do an effective job of cleaning the filter. This back pressure serves to dislodge dirt, moisture, etc., that may have become trapped in the filter 19. Under normal conditions it would clean the filter. After the brief period of time valve 26 would be closed and valve 29 would be opened to reestablish the original conditions for the detection of combustible gases in the area about the detection station.

Of course, if a combustible gas is detected by the sensor within cap 12, that information would be communicated to the alarm 39 in the conventional manner.

In the event that the filters 19 of the detection stations began becoming clogged to an extent such that the clogging was not substantially removed by the reverse blast of air, the flow across the respective orifice 36, 36' will drop below normal. This also might occur between the brief periods of time at which a cleaning blast was applied. When the flow drops below a usual operating average, that fact will be detected by the respective switch 37, 37'. The information is communicated to alarm 39 so that an indication is given to the operator of the system. Knowing that the filters 19 were becoming clogged, the operator would first operate the override 35 to attempt to blow the filters clean. If that didn't work, he would immediately go to the detection stations 10 and replace the filter.

I claim:

1. A method of using combustible gas detection heads to detect the presence of a combustible gas in a primary detection zone which heads have detector means positioned within diffusion type barriers, and enclosure walls about said barriers with at least a part of the walls being filters, and a conduit connecting to the spaces within the enclosure walls, said method comprising the steps of:

positioning a plurality of said heads at different locations in said primary zone to be monitored and thereafter observing the output of said detector means;

connecting said conduit to all of said heads;

applying a subatmospheric pressure to said conduit so that the subatmospheric pressure applied to said conduit is simultaneously applied to all of said heads to create an air flow from said area through said filters into said enclosures and about the barriers;

periodically removing the applied subatmospheric pressure and briefly replacing it with a fluid pressure above atmosphere to create a counterflow in said conduit so that the fluid pressure above atmosphere applied to said conduit is simultaneously applied to all of said heads sufficient to dislodge contaminates that may have lodged in said filters; and thereafter again applying said subatmospheric pressure to said conduit.

2. An apparatus for use in the detection of combustible gases in a primary zone in which combustible gases may be present and for use with a subatmospheric pressure source and a source of fluid under pressure greater than atmospheric, said apparatus comprising:

a detection head to be positioned in said primary zone and including a base, detector means mounted on said base, means mounted on said base and defining a diffusion type barrier about said detector means, said base and said barrier means being a unit of a given size, and an enclosure wall defining a space about said barrier and at least in part being formed by a filter, said enclosure wall being so formed that there is a distance between said unit and said filter, said enclosure wall having a conduit connection communicating with the space within said wall, said enclosure wall comprising a main body of generally cup-shaped configuration having a closed end and an open end, said body being threaded at said open end, and cap means threaded onto said open end and closing said open end, part of said cap means being formed by said filter, the base of said unit being removably attached to said closed end, said conduit connection being in said body and communicating with the interior thereof at a location that is farther removed from said filter than is the position of the barrier with respect to the filter; and control means communicating with said sources and with said conduit connection for applying a subatmospheric pressure to said space to create an air flow from said area through said filter into said enclosure and about the barrier, periodically removing the applied subatmospheric pressure and briefly replacing it with a fluid pressure above atmosphere in said space to create a counterflow in said conduit and head sufficient to dislodge contaminates that may have lodged in said filter, and thereafter again applying said subatmospheric pressure to said space.

3. An apparatus as set forth in claim 2, wherein said main body has an annular wall between said ends and defines a ring within said annular wall with a space between the annular wall and the ring, said unit extending through said ring, said connection communicating with said space about said ring.

* * * * *